(12) United States Patent
Schmidt et al.

(10) Patent No.: US 9,261,295 B1
(45) Date of Patent: Feb. 16, 2016

(54) HYBRID LIQUID-HYDROGEN AND HELIUM CRYOCOOLER SYSTEMS AND METHODS

(71) Applicant: Ball Aerospace & Technologies Corp., Boulder, CO (US)

(72) Inventors: Jeffrey A. Schmidt, Longmont, CO (US); Eric Marquardt, Boulder, CO (US)

(73) Assignee: BALL AEROSPACE & TECHNOLOGIES CORP., Boulder, CO (US)

( * ) Notice: Subject to any disclaimer, the term of this patent is extended or adjusted under 35 U.S.C. 154(b) by 334 days.

(21) Appl. No.: 13/851,001

(22) Filed: Mar. 26, 2013

Related U.S. Application Data

(60) Provisional application No. 61/615,636, filed on Mar. 26, 2012.

(51) Int. Cl.
*F25B 7/00* (2006.01)
*F25B 9/00* (2006.01)

(52) U.S. Cl.
CPC ...................... *F25B 9/002* (2013.01)

(58) Field of Classification Search
CPC ...................................................... F25B 9/002
See application file for complete search history.

(56) References Cited

U.S. PATENT DOCUMENTS

| | | | |
|---|---|---|---|
| 3,354,662 A * | 11/1967 | Daunt | 62/601 |
| 3,609,984 A * | 10/1971 | Garwin | 2/639 |
| 4,087,988 A * | 5/1978 | Pallaver et al. | 62/6 |
| 4,386,309 A * | 5/1983 | Peschka | 322/2 R |
| 4,825,667 A | 5/1989 | Benedict et al. | |
| 6,205,812 B1 | 3/2001 | Acharya et al. | |
| 6,336,331 B1 * | 1/2002 | White et al. | 62/48.2 |
| 6,520,581 B1 | 2/2003 | Tame | |
| 7,954,301 B2 | 6/2011 | Mills | |
| 2006/0096301 A1 * | 5/2006 | Triebe et al. | 62/6 |

FOREIGN PATENT DOCUMENTS

| | | |
|---|---|---|
| EP | 1106944 | 6/2001 |
| GB | 2441652 | 3/2008 |

(Continued)

OTHER PUBLICATIONS

D'Addario, "MMA Memo 228: Analysis of Tradeoffs in J-T Refrigerator Design," Sep. 1998, 10 pages.

(Continued)

*Primary Examiner* — Frantz Jules
*Assistant Examiner* — Emmanuel Duke
(74) *Attorney, Agent, or Firm* — Sheridan Rose P.C.

(57) ABSTRACT

Embodiments of the disclosed invention relate to providing cooling to instruments or other components. More particularly, hydrogen from a store is provided to pre-cool helium contained within a closed loop refrigeration circuit. Helium pre-cooled by the hydrogen, for example after expansion of the hydrogen in an expansion valve, is itself passed through an expansion valve, and applied to a heat load. The helium can be circulated through the refrigeration circuit using a compressor. The hydrogen used for pre-cooling the helium can be from a store of hydrogen that also provides fuel to a hydrogen consumer, for example for propulsion of a vehicle carrying the cooling system or for the production of electrical power. A hydrogen consumer can also be provided with hydrogen that has first been used to pre-cool the helium refrigeration circuit.

21 Claims, 5 Drawing Sheets

(56) References Cited

FOREIGN PATENT DOCUMENTS

| KR | 20110091929 | 8/2011 | | |
|----|----|----|----|----|
| WO | WO2007001432 A2 * | 1/2007 | ................ | F17C 9/02 |
| WO | WO 2007001432 A2 * | 1/2007 | ................ | H01F 6/04 |

OTHER PUBLICATIONS

Green, "Cryogenic Techniques for Large Superconducting Magnets in Space," Presented at 2nd Symposium on Space Cryogenics, Jul. 18-19, 1988, 26 pages.

* cited by examiner

HYBRID LIQUID-HYDROGEN AND HELIUM CRYOCOOLER SYSTEMS AND METHODS

CROSS REFERENCE TO RELATED APPLICATIONS

The present application claims the benefit of U.S. provisional patent application Ser. No. 61/615,636, filed Mar. 26, 2012, the entire disclosure of which is hereby incorporated herein by reference.

FIELD

Systems and methods for providing a hybrid hydrogen and helium cryocooler are provided.

BACKGROUND

It is often useful or desirable to cool devices and materials. For example, focal plane arrays and other instruments can often benefit from or require cooling to cryogenic (e.g. 10 Kelvin or less) temperatures. Systems for cooling devices and materials to cryogenic temperatures have required significant amounts of power, are heavy, and complex. In a typical cryocooler, a Stirling cryocooler is used to pre-cool gaseous helium to approximately 17 K. The gaseous helium is then used in a Joule-Thomson expansion to achieve temperatures between 4K to 10 K. Operation of such systems can, for example, require 414 W of electrical power to achieve 65 mW of heat lift at 10 K. The weight of a typical implementation of such a system is 45 kg. Accordingly, it is difficult and expensive to operate or to deploy such systems in remote environments, including but not limited to space or on-orbit environments. As a result, such cryocoolers have typically been limited to use in laboratories.

Other techniques for cooling devices and materials include expanding liquid hydrogen into a gas. However, the temperature that can be achieved by expanding liquid hydrogen has usually been limited to no less than 15 K. Moreover, this technique results in the consumption of the liquid hydrogen, which often is unacceptable in the context of the requirements of a given mission or application.

SUMMARY

The present disclosure is generally directed to hybrid cryocooler systems and methods. More particularly, systems and methods that utilize hybrid liquid hydrogen pre-cooling in combination with a re-circulated compressed helium loop are disclosed. In accordance with further embodiments, the liquid hydrogen ($LH_2$) can be obtained from a liquid hydrogen store that also supplies liquid hydrogen to an engine or other consumer, in addition to the hybrid cryocooler.

Systems in accordance with embodiments of the present disclosure generally include a hydrogen reservoir and a closed-loop helium refrigeration circuit. A hydrogen expansion valve supplied with hydrogen from the hydrogen reservoir is also provided. Hydrogen from the reservoir is passed through the hydrogen expansion valve, reducing the pressure of the hydrogen from a first, higher pressure, to a second, lower pressure. A first hydrogen pre-cooler heat exchanger is also provided. The first hydrogen pre-cooler heat exchanger receives as a first input hydrogen at the second pressure. The first hydrogen pre-cooler heat exchanger receives as a second input helium included in the helium refrigeration circuit.

The hydrogen reservoir or store can comprise a liquid hydrogen cryostat. In accordance with at least some embodiments of the present disclosure, the hydrogen reservoir can provide hydrogen to an engine, fuel cell, or other consumer of hydrogen, in addition to providing hydrogen to the first heat exchanger for pre-cooling helium in the helium refrigeration circuit. Moreover, hydrogen from the hydrogen reservoir can be provided to the first heat exchanger, and from the first heat exchanger to a consumer of hydrogen. Accordingly, hydrogen can be provided to the first heat exchanger and then to a consumer of the hydrogen in series. Alternatively or in addition, hydrogen from the hydrogen store can be provided to the first heat exchanger and to a consumer of the hydrogen in parallel. In accordance with still other embodiments, hydrogen that has been passed through the first heat exchanger can then be passed through or past other components, to provide additional cooling. For instance, hydrogen can be supplied to a vapor cooled shield surrounding the hydrogen store after being passed through the first heat exchanger. Moreover, after providing additional cooling, the hydrogen can be supplied to a consumer of hydrogen.

The helium refrigeration circuit generally includes a compressor, a helium expansion valve, and at least a first heat load interface. The helium expansion valve can include a J-T valve. Moreover, the helium expansion valve can include a variable orifice, and/or a fixed or variable orifice in combination with a bypass that is operable during system startup. The helium refrigeration circuit also includes a portion that passes through the first heat exchanger, for pre-cooling by the expanded hydrogen. A heat load interface is provided downstream of the first heat exchanger and helium expansion valve. The heat load interface can be thermally connected to a device, such as but not limited to an instrument, that requires or that can benefit from cooling.

Methods in accordance with embodiments of the present disclosure include providing a store of liquid hydrogen. Hydrogen from the store is passed through an expansion valve, decreasing the pressure of the hydrogen from a first, higher pressure, to a second, lower pressure. As can be appreciated by one of skill in the art after consideration of the present disclosure, the expansion of the hydrogen also results in decreasing the temperature of the hydrogen. For example, but without limitation, hydrogen in the hydrogen store can be maintained at a pressure of about 2 atm and a temperature of about 23K. Passing the hydrogen through the hydrogen expansion valve can bring the hydrogen to a pressure of about 0.1 atm or less, and a temperature of less than 20 K. In accordance with still other embodiments, the hydrogen is cooled to a temperature of about 15 K (as used herein, "about" means within ±10%). The expanded and cooled hydrogen can then be provided as a first input to a first hydrogen pre-cooler heat exchanger.

Methods in accordance with embodiments of the present disclosure additionally include providing a closed loop helium refrigeration circuit. A compressor is provided to circulate helium through the closed loop circuit, including through the first hydrogen pre-cooler heat exchanger. In the first hydrogen pre-cooler heat exchanger, the helium is pre-cooled. For example, but without limitation, the helium can be pre-cooled to a temperature of less than 16 K. After pre-cooling, the helium is expanded in an expansion valve, reducing the pressure of the helium, and also reducing the temperature of the helium to less than 10 K. For example, the helium can be cooled to 5 K or less. The helium is then provided to one or more heat load interfaces that are thermally connected to one or more heat loads, thereby providing cooling to the heat loads.

Additional features and advantages of embodiments of the present disclosure will become more readily apparent from the following description, particularly when taken together with the accompanying drawings.

DETAILED DESCRIPTION

The disclosed invention pertains in general to hybrid cryocooler systems and methods for providing high heat lift at cryogenic (e.g., 4 to 10 Kelvin) temperatures for focal plane array (FPA) and instrument cooling without the complexity of a Stirling or pulse tube cryocooler, or a dedicated liquid helium or solid hydrogen cryostat. This invention is applicable to various environments, including but not limited to those in which liquid hydrogen is plentiful as a consumable commodity, such as a fuel, or is specifically available as a consumable cryogen for cooling or both. Embodiments of the invention exploit the resident/native cryogenic heat sink and phase change enthalpy provided directly by, for example, a fuel reservoir of liquid hydrogen, at or below a temperature of 23 Kelvin, to directly or indirectly pre-cool helium gas below its inversion temperature in a closed cycle Joule-Thomson cryocooler prior to its isenthalpic expansion across an orifice or valve. Additional pre-cooling of the helium gas, to about (e.g., within ±10%) 15 Kelvin, is provided by heat exchange of the helium with a hydrogen fed thermodynamic venting system (TVS). The TVS isenthalpically expands liquid hydrogen from the reservoir/tank across a metered orifice to a two-phase condition resulting in net cooling down stream of the orifice and subsequently of the helium flowing in the TVS heat exchanger. The compressed helium fluid once cooled at or below 15 Kelvin in the TVS heat exchanger is expanded in a remote Joule-Thomson (J-T) valve cryocooler to achieve 10 K to 4 K cooling for a load, such as infrared sensors, instruments, or other devices. Residual cooling enthalpy of the vented hydrogen from the TVS can be further recuperated by passing the vented gas through vapor cooled shields surrounding the liquid hydrogen reservoir thereby reducing tank heating and the boil-off rate.

Figure 1:
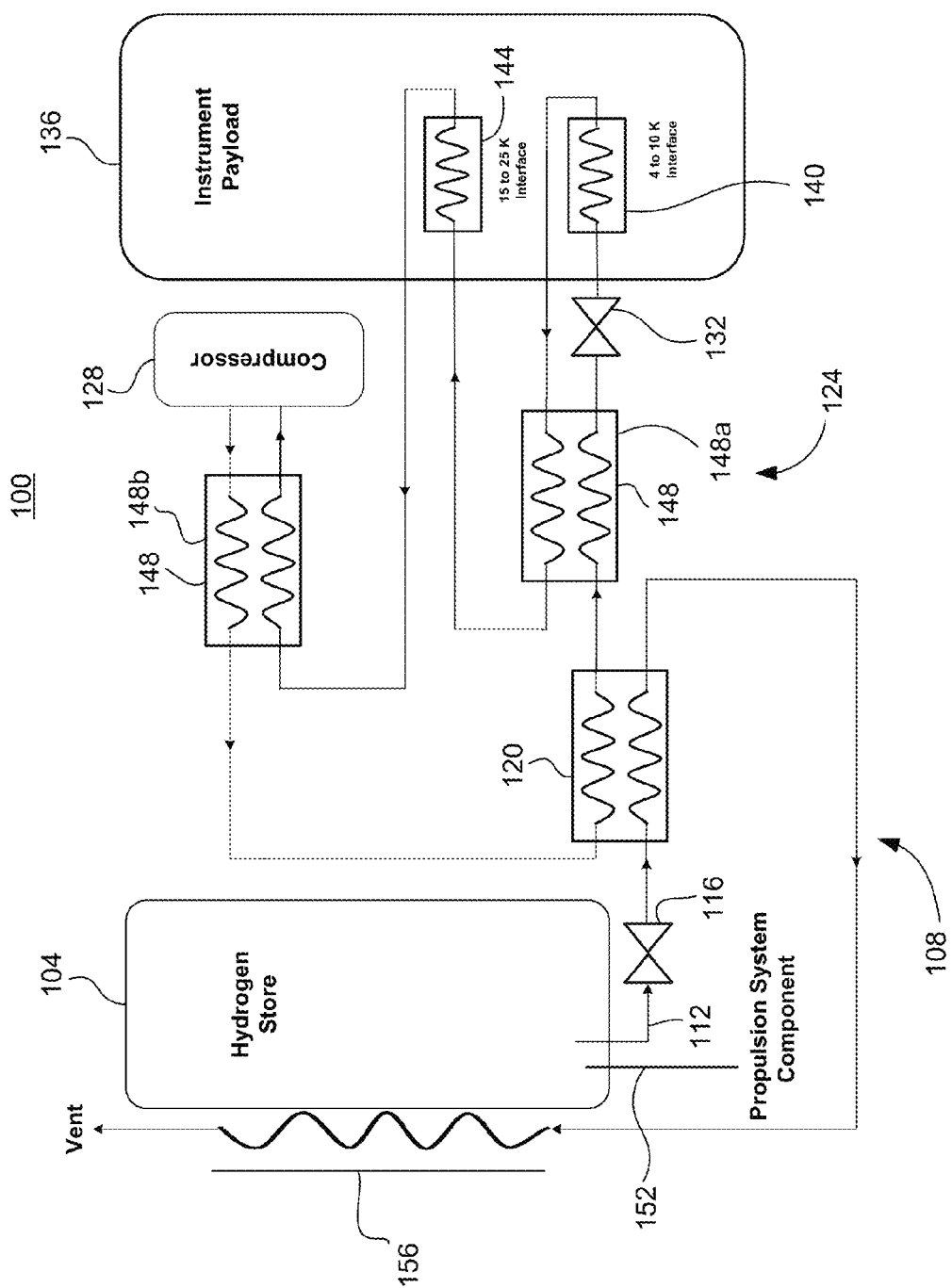
FIG. 1 is a block diagram of a hybrid hydrogen cryostat and closed loop helium refrigerator system in accordance with embodiments of the present invention.

FIG. 1 is a block diagram of a hybrid hydrogen and closed loop helium refrigeration system 100 in accordance with embodiments of the present invention. The system 100 generally includes a hydrogen store 104. More particularly, the hydrogen reservoir or store 104 may comprise a liquid hydrogen ($LH_2$) cryostat or fuel reservoir. In accordance with embodiments of the present disclosure, the hydrogen store 104 provides liquid hydrogen to a hydrogen pre-cooling loop 108 via a first outlet 112. The hydrogen removed from the hydrogen store 104 via the first outlet 112 can be passed through a hydrogen expansion valve 116. The expansion valve 116 may comprise a thermodynamic venting system (TVS) expansion valve, which isentropically expands the liquid hydrogen to a two phase condition, resulting in cooling downstream of the expansion valve 116. The expanded hydrogen is passed through a first hydrogen pre-cooler heat exchanger 120, which cools helium contained within a closed-loop helium refrigeration circuit 124.

The helium within the closed-loop helium refrigeration circuit 124 is circulated by a compressor 128. As an example, the compressor 128 may comprise a scroll compressor. In accordance with still other embodiments, the compressor 128 may comprise any device capable of compressing helium within the closed loop 124 by a desired amount at low temperatures (e.g., less than 30 K). The pre-cooling by the hydrogen in the first hydrogen pre-cooling heat exchanger 120 can, in an exemplary embodiment, provide cooling of the helium within the closed loop 124 to about 15 to 17 K. The helium within the closed loop 124 is then expanded in a valve, such as a Joule-Thomson (J-T) valve 132, to reduce the temperature of the helium within the closed loop 124 to a range of from about 4 K to about 10 K. The J-T valve 132 may comprise a variable J-T valve. In accordance with still other embodiments, a bypass line (not shown) may be provided around the J-T valve 132 and the high pressure side of a first secondary heat exchanger 148, to facilitate circulation of helium through the closed loop 124 upon system startup. More particularly, the bypass line would be used to pre-cool the interface loads 140, 144 within the instrument payload to ~15 K prior to beginning J-T cooling. This reduces the back pressure experienced on the low-pressure side of the J-T orifice when load temperatures are near or above the helium inversion temperature. The use of a variable J-T valve 132 allows a bypass line to be eliminated. Instead, the valve could be operated in a relatively open configuration during startup, and in a relatively narrow or restricted configuration during normal operation.

After throttling the helium using the J-T valve 132, the cooled helium can be applied to a heat load 136. As an example, the heat load 136 may comprise an instrument payload with one or more components that require or benefit from cooling to at or near 4 K to 10 K temperatures. As can be appreciated by one of skill in the art after consideration of the present disclosure, such heat load 136 components can be placed in thermal communication with a first head load interface 140 for cooling by the first heat load interface 140. Helium passed through the first heat load interface 140 can then be provided to a second heat load interface 144. The second heat load interface 144 may be associated with one or more heat load 136 components that require or benefit from cooling, but to a lesser extent than components associated with the first heat load interface 140. As an example, the second heat load interface 144 may provide cooling to between about 15 K and 25 K temperatures. Although shown as including first 140 and second 144 head load interfaces, any number of heat load interfaces can be included.

As shown in the figure, the helium loop 124 can be associated with various secondary heat exchangers 148. For example, a first secondary heat exchanger 148a can cool the helium prior to expansion in the J-T valve 132. The cooling medium supplied to the first secondary heat exchanger 148a can comprise the helium within the closed loop 124, after that helium has been passed through the first heat load interface 140, and before the second heat load interface 144. As another example, a second secondary heat exchanger 148b can be provided to cool helium within the closed loop 124 after compression in the compressor 128. The cooling medium for the second secondary heat exchanger 148b can comprise helium within the closed loop 124, after that helium has passed through the second heat load interface 144. In accordance with embodiments of the present disclosure, the heat exchangers 120, 148 may comprise microchannel plate recuperators/heat exchangers. The heat load interfaces 140, 144 may comprise microchannel plate and metallic heat conductor interfaces.

In accordance with at least some embodiments of the present disclosure, the hydrogen store can be associated with a propulsion system inlet/outlet 152. In general, the propulsion system inlet/outlet 152 can operate to receive liquid hydrogen from or deliver liquid hydrogen to a propulsion system component. For example, where the cooling system 100 is associated with a vehicle associated with a liquid fuel rocket, surplus hydrogen can be transferred from a liquid hydrogen fuel tank to the hydrogen store 104 via the inlet/outlet 152. An inlet/outlet 152 can also provide hydrogen from the hydrogen store 104 to a hydrogen consumer, such as a propulsion unit, an internal combustion engine, fuel cell or a liquid fuel rocket engine. Moreover, hydrogen can be supplied from the hydrogen store 104 for pre-cooling in association with the helium loop 124 via the outlet 112, and to a propulsion unit via the inlet/outlet 152, simultaneously. In accordance with still other embodiments, hydrogen can be provided to a hydrogen consumer after the hydrogen has been passed through the hydrogen pre-cooler heat exchanger 120 and the heat load interface 140 and/or 144.

After pre-cooling the helium in the hydrogen pre-cooler heat exchanger 120, the hydrogen can be vented to the atmosphere or to the vacuum of space. In accordance with at least some embodiments, the hydrogen can be passed across exterior portions of the hydrogen store 104, through a vapor cooled shield 156, to assist the hydrogen store in maintaining hydrogen contained therein cool (e.g., at a temperature of around 23 K). In addition, hydrogen in parahydrogen form can be converted to orthohydrogen form in the vent for further enthalpy recuperation.

Figure 2:
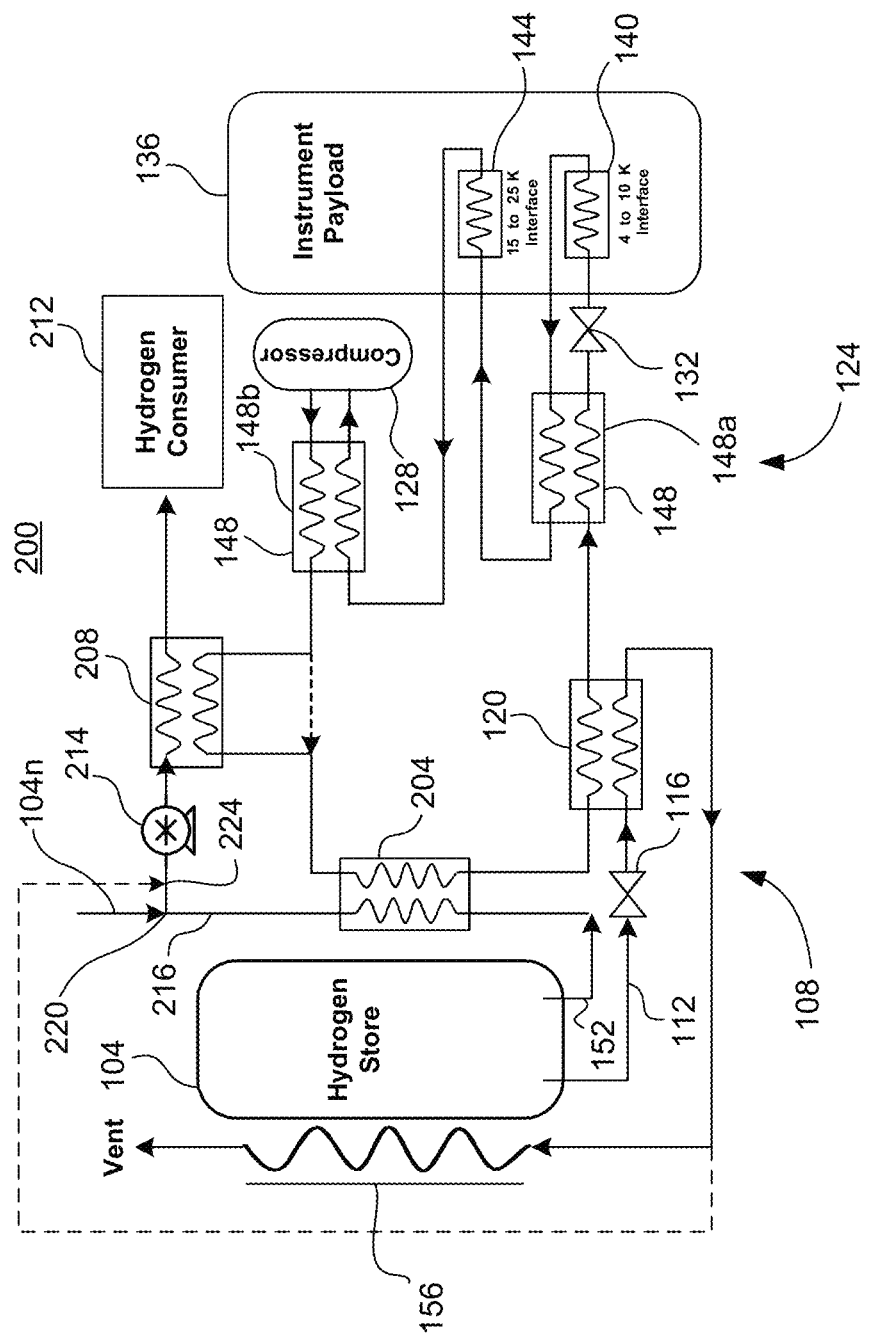
FIG. 2 is a block diagram of a hybrid hydrogen cryostat and closed loop helium refrigerator system in accordance with other embodiments of the present invention.

FIG. 2 illustrates a hybrid hydrogen and helium cryocooler 200 in accordance with further embodiments of the present disclosure. Here the helium in the helium refrigeration circuit or J-T circuit 124 is initially cooled with a 20 to 23 K flow of liquid hydrogen provided from a hydrogen store 104 comprising a fuel tank via a propulsion system outlet 152 to a second hydrogen pre-cooler such as a heat exchanger 204 and/or a third hydrogen pre-cooler heat exchanger 208 on its way to a hydrogen consumer 212, such as a High Altitude Long Endurance (HALE) aircraft engine. As shown, one or more pumps 214 can be provided to supply the hydrogen to the hydrogen consumer 212 at a desired pressure and/or rate.

The second 204 and/or third 208 hydrogen pre-cooler heat exchangers can reside either in the fuel-flow line 216 of a single hydrogen store or $LH_2$ fuel tank 104 or downstream of the fuel-flow junction 220 of a plurality of $LH_2$ fuel tanks 104n. The pre-cooling location is dependent on the amount of initial pre-cooling heat lift required by the helium refrigeration circuit. Accordingly, embodiments of the present invention can be operated with a plurality of separate hydrogen stores 104. Once initially pre-cooled to 20 to 23 K in the fuel flow heat exchangers 204, 208, the helium is further cooled with the hydrogen pre-cooling loop or TVS 108. Depending on the heat lift required at the payload interface, significantly less $LH_2$ needs to be utilized in the TVS 108 to pre-cool the helium to 15 K as compared to the J-T refrigeration scheme shown in FIG. 1 (not benefiting from initial pre-cooling to 20-23 K by the fuel flow line 216). Here again, a bypass loop (not shown) around the helium expansion valve 132 or alternatively a variable orifice J-T valve 132 may be required to pre-cool the interface loads in the instrument payload in order to reduce the back pressure on the low-pressure side of the valve 132.

In addition, hydrogen can be supplied to the hydrogen consumer 212 after it has passed through the hydrogen pre-cooling loop 108. For example, after being passed through the hydrogen expansion valve 116 and the first hydrogen pre-cooler heat exchanger 120, hydrogen from the hydrogen pre-cooling loop 108 can be introduced to the fuel-flow line 216 via an ejector 224. In accordance with still other embodiments, hydrogen from the hydrogen pre-cooling loop 108 can be introduced to the fuel-flow line 216 by an ejector 224 after being passed through a vapor cooled shield 156. An ejector 224 can be located upstream or downstream of a fuel-flow junction 220 (for embodiments utilizing a plurality of hydrogen stores 104). Accordingly, a fuel-flow line 216 can be supplied from a hydrogen source 104 to a hydrogen consumer 212 by one or both of a propulsion system outlet 152 and a first outlet 112.

Figure 3:
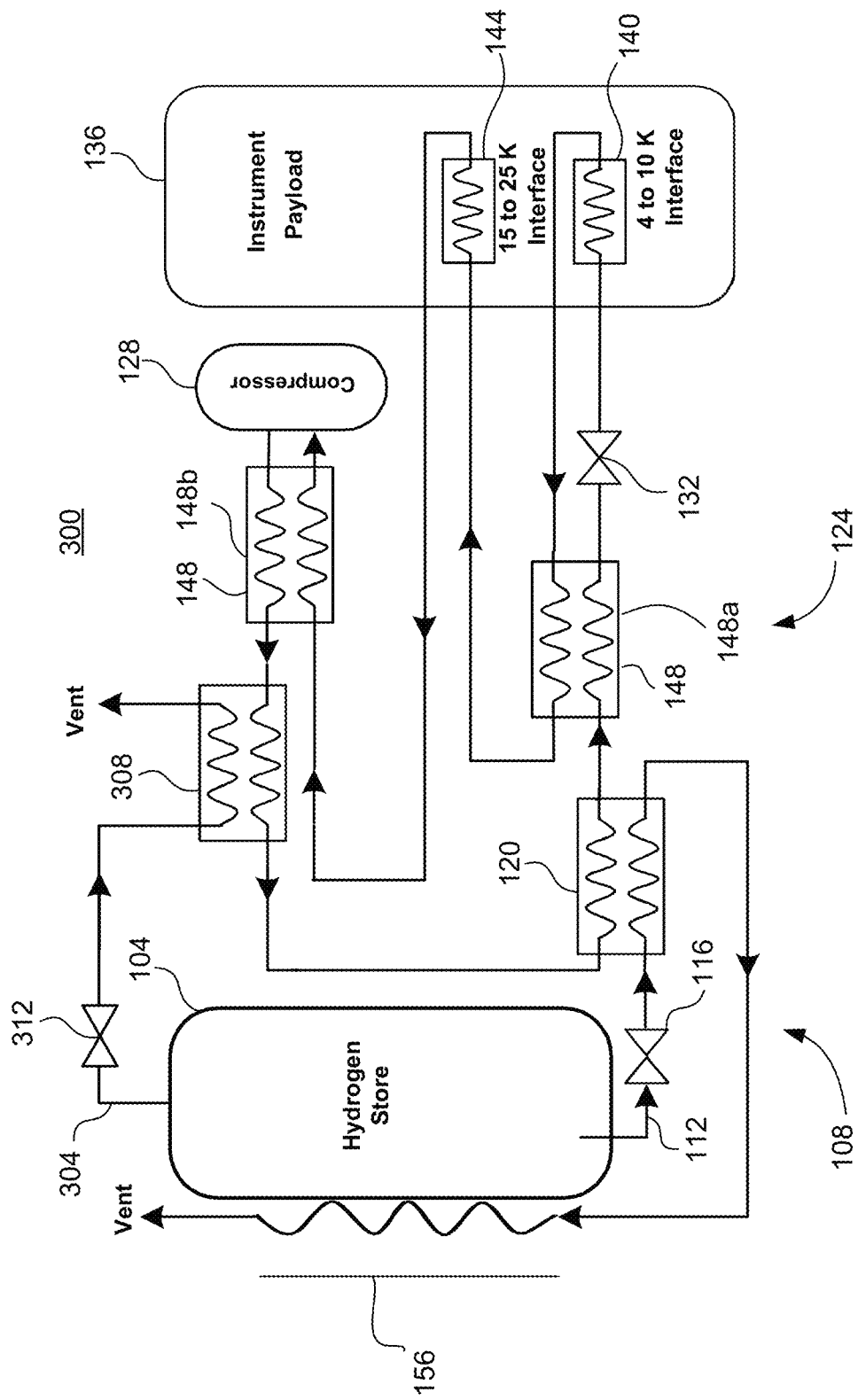
FIG. 3 is a block diagram of a hybrid hydrogen cryostat and closed loop helium refrigerator system in accordance with other embodiments of the present invention.

FIG. 3 depicts a hybrid liquid hydrogen and helium cryocooler system 300 in an embodiment in which the helium is initially cooled in a hydrogen ullage heat exchanger 308 serviced by the hydrogen ullage vent 304 from the cryostat. Additionally, the vent gas from the VCS 156 line can be coupled downstream of the pressure control vent valve 312 to further increase overall pre-cooling (resulting in a single common vent). In accordance with other embodiments, hydrogen from the vent 304 and/or hydrogen that has passed through the hydrogen pre-cooling loop 108 can be supplied to a hydrogen consumer 212. In accordance with further embodiments, an additional recuperator/heat exchanger can be provided that further pre-cools the helium after it has passed through the heat exchanger 308 serviced by the hydrogen ullage vent and before it is passed to the recuperator/heat exchanger that is serviced by the hydrogen that has been passed through the TVS 108. This additional heat exchanger (not shown) can be serviced by direct cooling at the $LH_2$ tank or the liquid.

In accordance with embodiments of the present disclosure, a hybrid liquid-hydrogen cryostat/Joule-Thomson (J-T) cryocooler producing significant heat lift at 4 to 10 K temperatures is provided. The J-T cryocooler may comprise a closed cycle refrigerator where the working fluid is compressed and circulated by a warm ambient mechanical compressor. The working fluid of the closed cycle J-T cryocooler refrigerator may comprise the isotopes helium-4 or helium-3. In addition, a liquid hydrogen cryostat may be provided for pre-cooling the helium working fluid below the J-T inversion temperature. More particularly, pre-cooling can include providing a liquid hydrogen thermodynamic venting system (TVS) that is supplied with liquid hydrogen from the liquid hydrogen cryostat. This pre-cooling can reduce the temperature of the helium working fluid, for example to temperatures above the triple point of hydrogen (13 K). Following pre-cooling by the hydrogen, the helium can be passed through a J-T expansion valve/orifice for isenthalpic expansion of the pre-cooled compressed helium. The resulting expanded helium can provide cooling to a heat load in a range of, for example, from about 4 K to about 10 K.

In addition, the pre-cooling can include the use of a plurality of heat exchangers/recuperators in the flow path of the J-T cryocooler to preserve the enthalpy of the circulating helium prior to return of the low pressure helium to the ambient mechanical compressor/circulator. In accordance with at least some embodiments, the compressor can be operated at cryogenic temperatures, which can reduce or eliminate the need for an ambient heat exchanger/recuperator. The J-T expansion valve can include a valve having a variable orifice size. Alternatively or in addition, a bypass can be provided around the J-T expansion valve during initial cooling of the load with helium pre-cooled by the liquid hydrogen thermodynamic venting system to a temperature above the triple point of hydrogen prior to closing the bypass circuit and operating the J-T expansion valve.

In accordance with at least some embodiments, the hydrogen store is in communication with a propulsion or a power supply system. Examples include hydrogen carried as part of a liquid fueled rocket propulsion system, or hydrogen carried as a fuel for an internal combustion engine or fuel cell. For instance, at least some hydrogen from the hydrogen store can be used as a fuel for a vehicle propulsion system. Moreover, hydrogen can be provided as a fuel for propulsion and as a cooling medium to pre-cool the helium circuit simultaneously or sequentially. For example, where the hydrogen store provides fuel for a rocket engine, that fuel is first used as a component of the rocket propellant, and then remaining hydrogen can be used to pre-cool the helium refrigeration circuit as described herein, directly from the hydrogen store, or after transferring hydrogen to a secondary store. As a further example, where the hydrogen is used as a fuel for an internal combustion engine, hydrogen can be supplied to the engine and to heat exchangers for pre-cooling the helium simultaneously. As yet another example, hydrogen supplied to an internal combustion engine can, before being delivered to the internal combustion engine, provide pre-cooling. Moreover, pre-cooling provided by a flow of hydrogen to an engine can be in combination with a second, parallel flow of hydrogen for expansion and further pre-cooling of the helium.

Figure 4:
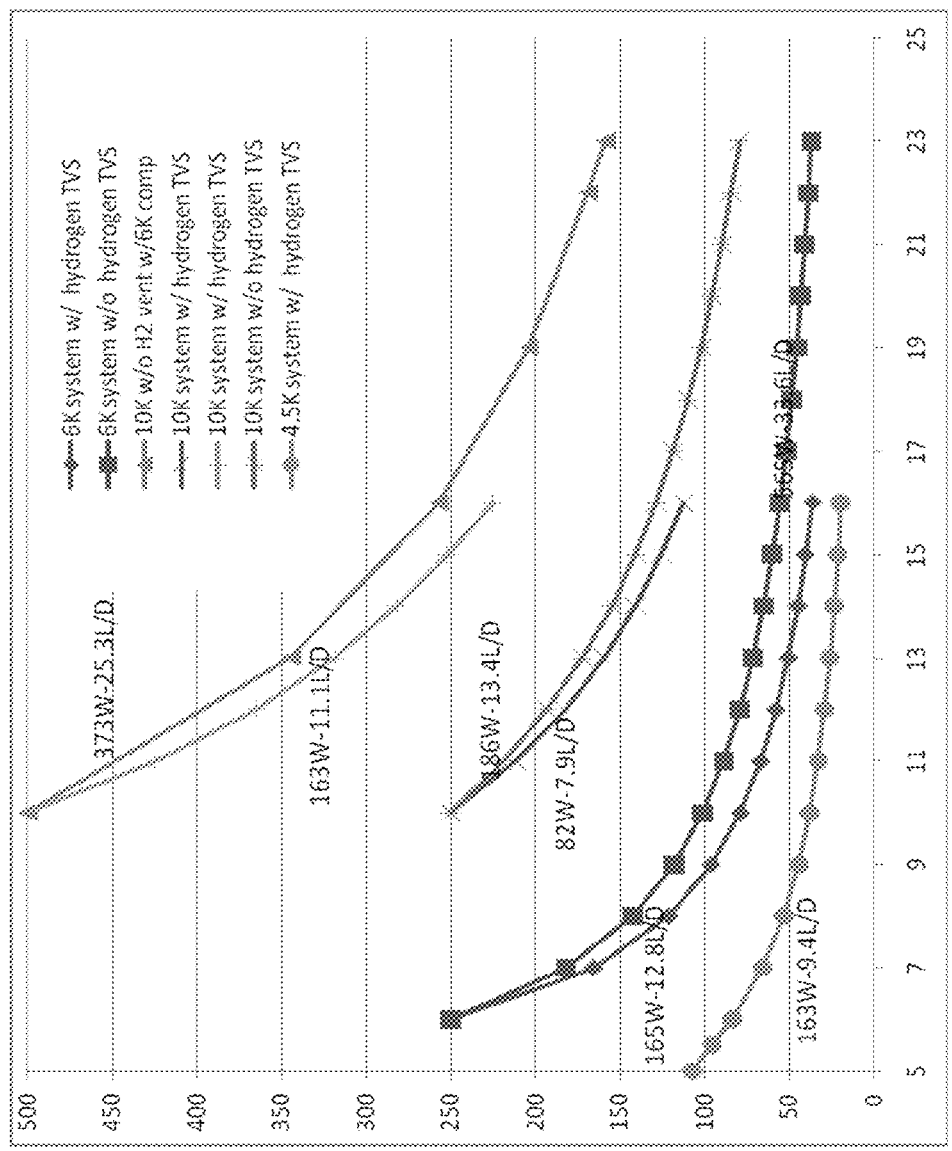
FIG. 4 depicts the performance of different hybrid cooling systems in accordance with embodiments of the present invention.

FIG. 4 depicts the performance of different hybrid cooling systems in accordance with embodiments of the present disclosure. More particularly, FIG. 4 shows hydrogen consumption versus compressor power and heat lift at various temperatures. Specifically, the x-axis shows temperature (K) and the y-axis shows heat lift (mW). The various curves depict the heat lift during the transient cool down of system configurations of fixed J-T valve size designed for different operating temperatures with and without a TVS or hydrogen pre-cooling loop 108 as described herein. Shown for each curve is the adiabatic compressor input power (30% efficient) and $LH_2$ consumption rate. Note how the TVS substantially reduces both input power and $LH_2$ consumption rate.

Figure 5:
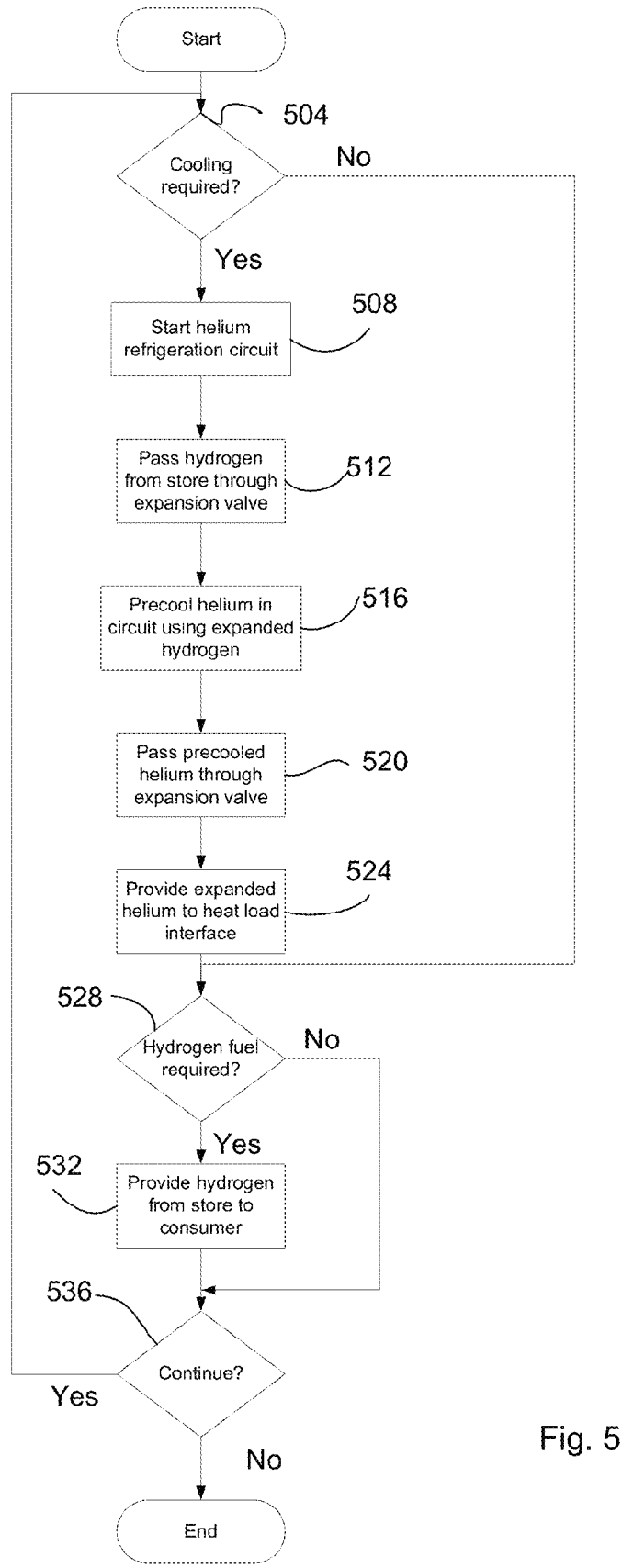
FIG. 5 is a flowchart depicting aspects of the operation of a system in accordance with embodiments of the present disclosure.

FIG. 5 is a flowchart depicting aspects of a method for providing a hybrid liquid hydrogen and helium cryocooler in accordance with embodiments of the present disclosure. In general, methods in accordance with embodiments of the present disclosure can be performed in connection with a liquid hydrogen store 104 that supplies hydrogen to a hydrogen pre-cooling loop 108 interfaced with a helium refrigeration circuit as described herein. Initially, at step 504, a determination is made as to whether cooling is required. Cooling can be required, for example, where a device, such as a focal plane array or other instrument or device that requires cooling, is or will be operated. As an example, but without limitation, the cooling system and the device that requires cooling can be carried by the same vehicle, such as but not limited to an aircraft or satellite. If cooling is required, the helium refrigeration circuit 124 can be started (step 508). Starting the helium refrigeration circuit can include providing power to operate the compressor 128 to circulate helium within the refrigeration circuit 124. Moreover, during system startup, the helium can be routed through a bypass rather than through the helium expansion valve 132, or a variable expansion valve 132 can be operated in a relatively open condition, to pre-cool the heat load interface 140 (and 144 if provided) in order to reduce the back pressure on the low pressure side of the helium expansion valve 132. Once pre-cooling of the load interface or interfaces 140, 144 has been accomplished, the helium can be routed through the helium expansion valve 132, rather than through the bypass, or a variable helium expansion valve 132 can be placed in a relatively closed or throttled position.

In addition, hydrogen from the hydrogen store can be passed through a hydrogen expansion valve 116 (step 512). In accordance with embodiments of the present disclosure, the hydrogen in the store may be maintained at a temperature of about 23 K or less, and a pressure of about 2 atm or less. By passing the hydrogen from the store through the expansion valve 116, with a pressure on the downstream or low pressure side of the expansion valve 116 relatively low (e.g., about 0.1 atm or less), the temperature of the hydrogen can be reduced to about 15 K or less. Although passing the hydrogen from the hydrogen store through the expansion valve 116 is shown as occurring after the helium refrigeration circuit 124 has been started, it should be appreciated that the steps can be performed in opposite order, or concurrently.

At step 516, the helium in the helium refrigeration circuit 124 is pre-cooled using the expanded hydrogen. More particularly, after being expanded and cooled by the hydrogen expansion valve 116, the hydrogen is provided to a first input of a first hydrogen pre-cooler heat exchanger 120. The helium refrigeration circuit 124 passes through the first hydrogen pre-cooler heat exchanger 120, with the helium being provided to the first hydrogen pre-cooler heat exchanger 120 as a second input. In accordance with embodiments of the present disclosure, the step of pre-cooling the helium in the first hydrogen pre-cooler heat exchanger 120 using the expanded hydrogen can bring the helium to a temperature of less than 20 K. In accordance with still other embodiments, the temperature of the helium after being cooled in the first hydrogen pre-cooler heat exchanger 120 can be from about 15 K to about 17 K.

The pre-cooled helium is then passed through the helium expansion valve 132, while the expansion valve is in an operable state (step 520). Passing the helium through the helium expansion valve 132 can reduce the temperature of the helium within the closed loop 124 to a range of from about 4 K to about 10 K. The expanded helium is then provided to the first heat load interface 140 (step 524). The heat load interface 140 can in turn cool a component comprising at least a portion of an instrument payload 136. As an example, but without limitation, the instrument payload 136 cooled by the first heat load interface 140 can include a focal plane array. In accordance with still other embodiments, the helium can be provided to additional heat load interfaces 144, for example for cooling components included in an instrument payload 136 that require cooling to a temperature greater than the components served by the first heat load interface 140. For instance, the second heat load interface 144 may provide cooling to a component included in the instrument payload 136 to between 10 K and 30 K.

At step 528, a determination can be made as to whether a consumer of hydrogen 212 requires hydrogen as a fuel. If a hydrogen consumer 212 is in need of hydrogen, that hydrogen can be provided from the hydrogen store 104 to the hydrogen consumer (step 532). Moreover, that hydrogen can be provided directly from the store 104, or via the pre-cooling heat exchanger 120. Accordingly, hydrogen can be provided from the hydrogen store 104 to the hydrogen pre-cooling loop 108 and to a hydrogen consumer 212 simultaneously. Moreover, hydrogen can be supplied from the store 104 to the hydrogen pre-cooling loop and to the hydrogen consumer 212 in series and/or in parallel. In accordance with still other embodiments, the hydrogen can be provided via another heat exchanger in addition to or instead of the hydrogen pre-cooling heat exchanger 120. In an exemplary embodiment, the hydrogen may be provided to a hydrogen consumer via a pump, that provides hydrogen to the consumer at a pressure of from about 2 atm to about 9 atm.

At step 536, a determination can be made as to whether operation of the hybrid hydrogen and helium cryocooler system is to continue. If operation is to continue, the process can return to step 504, alternatively, the process can end.

A hybrid-cryocooler in accordance with embodiments of the present invention can include a liquid-hydrogen ($LH_2$) cryostat or fuel reservoir and a Joule-Thomson cryocooler to provide focal plane array (FPA) or sensor/instrument cooling in the range of 4 K to 10 K for lower power and cost than available with current state-of-the-art cryocoolers.

Several mission environments are uniquely suited to support such a cooler and include any spacecraft/payload receiving $LH_2$ transferred from a cryogenic upper stage (e.g., the proposed United Launch Alliance's or ULA CRYogenic Orbital TEstbed or CRYOTE concept) and emerging mission platforms such as the High Altitude Long Endurance (HALE) aircraft utilizing liquid hydrogen as the fuel. The CRYOTE mission concept leverages residual $LH_2$ available in a Centaur/Delta Cryogenic Second Stage (DCSS) following launch. The residual unused $LH_2$ is transferred on-orbit into a spacecraft's scientific payload cryostat. Likewise, the HALE mission concept leverages the large fuel reservoirs of $LH_2$ that must be continually metered to the engines but vaporized from liquid to gas prior to final engine utilization. Large unmanned HALE aircraft (the Boeing Phantom Eye HALE aircraft for example) can now support Stratospheric Observatory for Infrared Astronomy or SOFIA-like infrared payloads resident at near-space (65 kft) altitudes for persistent astronomical, weather or ISR observation missions lasting for ~10-days. In both of these space and near-space mission scenarios respectively, the $LH_2$ can provide the pre-cooling for a Joule-Thomson (J-T) cryocooler operating between 4 K and 10 K allowing low power/low cost FPA/instrument cooling to very low temperatures without the burden of a high power cryocooler for pre-cooling.

Embodiments of the disclosed invention allow short duration/lower cost missions hosted on a CRYOTE-like rideshare to use low temperature (4 K to 10 K) sensors for a much lower cost by launching a warm cryostat, filling it on-orbit from the leftover launch vehicle $LH_2$, and using an ambient compressor to circulate helium fluid through a J-T cryocooler. The J-T fluid line is pre-cooled by the $LH_2$ and expanded in a J-T valve to cool an FPA/sensor to 4 K to 10 K for much lower cost than current state-of-the-art cryocoolers. Launching a warm cryostat allows a simplified cryogenic design as many parasitic losses associated with structural support required for launch survival can be reduced or eliminated, and no vacuum jacket or purge is required. The leftover $LH_2$ provides a 20 K heat sink, which eliminates the need for a low temperature Stirling or pulse tube cryocooler such as is required on the NASA JWST MIRI instrument. The J-T cryocooler then only requires a small compressor capable of modest pressure ratios and mass flows to provide significant cooling at temperatures down to 4 K. Mission durations will be limited by the $LH_2$ supply, but this approach will significantly reduce the power and cost required to reach very low temperatures such that small NASA Explorer class missions with specific scientific goals become viable missions. For commercial, civil and military missions deployed in near-space environments, this technology also enables economical 4 K to 10 K sensor payloads on HALE aircraft such as Boeing's Phantom Eye or AeroVironment's Global Observer, which are fueled by $LH_2$.

In accordance with embodiments of the present invention a high heat lift, lower power 4 to 10 Kelvin cryocooler for providing cooling of FPA, sensors and instruments operating in the infrared, microwave or terahertz regime for space or near space environments is described. The subject cryocooler comprises a helium closed-cycle Joule-Thomson refrigerator integrated with a $LH_2$ reservoir and TVS helium pre-cooler to produce hundreds of milliwatts of cooling at 4 to 10 Kelvin while consuming only hundreds of watts of J-T compressor power and not more than 10 liters (~700 grams) of $LH_2$ consumption via the TVS per day.

In accordance with further embodiments of the present invention, the J-T helium flow may be pre-cooled directly to 20 to 23 Kelvin in the hydrogen reservoir or in the liquid hydrogen fuel-flow stream prior to being further cooled to 17 to 15 Kelvin via the TVS. This later embodiment greatly reduces the TVS heat load and therefore overall hydrogen consumption by the TVS. Low pressure vented TVS gas may further be combined with the higher pressure HALE engine fuel feed via an ejector to maximize fuel utilization. An additional embodiment for $LH_2$ reservoirs that are not utilized for fuel allows the J-T helium flow to be pre-cooled by the normal tank vent gas prior to TVS cooling. This reduces parasitic heat loads on the $LH_2$ reservoir but still allows some appreciable pre-cooling of the helium gas prior to the TVS.

Embodiments of the invention allow J-T compressor power (variable compression and expansion ratios and helium flow rates) to be varied against TVS hydrogen consumption rates for comparable heat lifts. This allows cryocooler performance optimization depending on the flight system resource allocation (power versus hydrogen capacity).

Further embodiments allow the compressor to be comprised of a Stirling cryocooler compressor (normally an alternating current (AC) flow cycle) with a direct current (DC) gas flow achieved with passive reed valves. Additionally, DC flow compressors can include positive displacement Scottish yoke, rotary vane, and reed valve linear compressors as well as oil-less scroll compressors. All of these compressors are operated at ambient conditions. If available, cold gas compressors or cryopumps capable of operating at or near pre-cooler temperatures are also an embodiment of the invention as they eliminate the need for a warm stage heat exchanger but potentially at the expense and complexity of a cryogenic machine. All compressor systems however should provide contamination free (oil and particle free) helium circulation to eliminate contaminant freeze-out at the pre-cooler or J-T valve thereby clogging the system.

The foregoing discussion of the invention has been presented for purposes of illustration and description. Further, the description is not intended to limit the invention to the form disclosed herein. Consequently, variations and modifications commensurate with the above teachings, within the skill or knowledge of the relevant art, are within the scope of the present invention. The embodiments described hereinabove are further intended to explain the best mode presently known of practicing the invention and to enable others skilled in the art to utilize the invention in such or in other embodiments and with various modifications required by the particular application or use of the invention. It is intended that the appended claims be construed to include alternative embodiments to the extent permitted by the prior art.

What is claimed is:
1. A system, comprising:
a hydrogen reservoir;

first and second hydrogen supply conduits;
a helium refrigeration circuit;
a hydrogen expansion valve, wherein the first hydrogen supply conduit interconnects the hydrogen reservoir with the hydrogen expansion valve, wherein hydrogen from the hydrogen reservoir is passed through the hydrogen expansion valve and the hydrogen is brought from a first pressure at the inlet of the hydrogen expansion valve to a second pressure at the outlet of the hydrogen expansion valve, wherein the first pressure is higher than the second pressure, and wherein the second pressure is a low pressure;
a first heat exchanger, wherein the first heat exchanger receives as a first input hydrogen from the hydrogen expansion valve at the second pressure, and wherein the first heat exchanger receives as a second input helium included in the helium refrigeration circuit; and
a second heat exchanger, wherein the second hydrogen supply conduit interconnects the hydrogen reservoir with the second heat exchanger, wherein the second heat exchanger receives as a first input hydrogen from the second hydrogen supply conduit as a liquid, wherein the second heat exchanger receives as a second input helium included in the helium refrigeration circuit, and wherein the helium in the helium refrigeration circuit passes through the second heat exchanger prior to passing through the first heat exchanger.

2. The system of claim 1, wherein the second pressure is less than 1.5 psi.

3. The system of claim 1, wherein the temperature of the hydrogen at the outlet of the hydrogen expansion valve is less than or equal to 15 K.

4. The system of claim 1,
wherein the second hydrogen supply conduit is a hydrogen fuel supply conduit.

5. The system of claim 4, wherein the second hydrogen supply conduit is connected to a hydrogen consumer.

6. The system of claim 5, wherein the hydrogen consumer includes at least one of: a fuel cell; an internal combustion engine; a turbine; and a rocket motor.

7. The system of claim 4, wherein the hydrogen passed through the hydrogen expansion valve is vented to an ambient atmosphere.

8. The system of claim 1, further comprising:
a helium expansion valve, wherein the helium expansion valve is in communication with a helium outlet of the first heat exchanger.

9. The system of claim 8, wherein the helium expansion valve has a variable orifice.

10. The system of claim 8, further comprising:
a compressor, wherein the helium is moved through the helium refrigeration circuit by the compressor.

11. The system of claim 1, wherein the hydrogen provided to the second heat exchanger exits the second heat exchanger as a liquid.

12. The system of claim 11, wherein at least some of the hydrogen passed through the hydrogen expansion valve enters the first heat exchanger as a gas.

13. A system, comprising:
a first hydrogen reservoir, wherein hydrogen in the first hydrogen reservoir is at a first pressure;
a first hydrogen conduit;
a first hydrogen expansion valve, wherein the first hydrogen expansion valve is supplied with liquid hydrogen from the first hydrogen reservoir by the first hydrogen conduit, and wherein at least some of the hydrogen exits an outlet of the first hydrogen expansion valve as a gas;
a first heat exchanger, wherein a first inlet of the first heat exchanger is in communication with the outlet of the first hydrogen expansion valve;
a second hydrogen conduit;
a second heat exchanger, wherein a first inlet of the second heat exchanger is supplied with liquid hydrogen from the first hydrogen reservoir by the second hydrogen conduit, and wherein hydrogen exits a first outlet of the second heat exchanger as a liquid;
a fuel flow line that interconnects the first outlet of the second heat exchanger to a hydrogen consumer;
a helium circuit, wherein the helium circuit passes through the first and second heat exchangers, and wherein the helium circuit includes:
a compressor;
a helium expansion valve, wherein an inlet of the helium expansion valve is in communication with an outlet of the first heat exchanger;
a first heat load interface, wherein a first input of the first heat load interface is in communication with an outlet of the helium expansion valve.

14. The system of claim 13,
wherein the hydrogen that has passed through the first hydrogen conduit is vented to the atmosphere.

15. The system of claim 14,
wherein after the helium circuit passes helium through the second heat exchanger the helium circuit passes the helium through the first head exchanger.

16. The system of claim 13, wherein the system is installed in a vehicle, wherein the hydrogen consumer at least one of generates electricity and a motive force, and wherein the first heat load interface is in thermal contact with an instrument.

17. A method for cooling a heat load, comprising:
providing a source of hydrogen, wherein the source of hydrogen is at a high pressure;
delivering hydrogen from the source of hydrogen to a hydrogen expansion valve using a first conduit;
expanding at least some of the hydrogen from the source of hydrogen through the hydrogen expansion valve, wherein the hydrogen is brought to a low pressure, wherein at least some of the hydrogen is transformed to a gas phase, and wherein the hydrogen is cooled to less than 20 K;
passing the at least some of the hydrogen at a low pressure from the hydrogen expansion valve to a first heat exchanger;
passing the at least some of the hydrogen delivered by the first conduit through the first heat exchanger as a gas;
delivering hydrogen from the source of hydrogen to a second heat exchanger using a second conduit;
passing the hydrogen delivered by the second conduit through the second heat exchanger as a liquid;
passing helium through the second heat exchanger, wherein the helium is cooled in the second heat exchanger to less than 23 K;
passing helium through the first heat exchanger, wherein the helium is cooled in the first heat exchanger to less than 16 K;
expanding the helium cooled by the first heat exchanger in a helium expansion valve, wherein the helium is cooled to less than 10 K;
delivering the helium cooled to less than 10 K to a first heat load.

18. The method of claim 17, further comprising:
providing the hydrogen that has passed through at least one of the first and second conduits to a hydrogen consumer.

19. The method of claim 18, wherein the hydrogen consumer includes a fuel cell, and wherein the method further comprises generating electricity.

20. The method of claim 18, wherein the hydrogen provided to the hydrogen consumer is hydrogen that has passed through the second heat exchanger, wherein the hydrogen is provided to the hydrogen consumer as a liquid, wherein the hydrogen consumer includes at least one of a motor or an engine, and wherein the method further comprises generating a motive force.

21. The method of claim 17, wherein the high pressure is at least 30 psi, and wherein the low pressure is less than 2 psi.

* * * * *

UNITED STATES PATENT AND TRADEMARK OFFICE
CERTIFICATE OF CORRECTION

| | | |
|---|---|---|
| PATENT NO. | : 9,261,295 B1 | Page 1 of 1 |
| APPLICATION NO. | : 13/851001 | |
| DATED | : February 16, 2016 | |
| INVENTOR(S) | : Jeffrey A. Schmidt and Eric Marquardt | |

It is certified that error appears in the above-identified patent and that said Letters Patent is hereby corrected as shown below:

On the title page item 74 Attorney, Agent, or Firm, please delete "Rose" and insert -- Ross --; and In the claims Claim 15, Column 12, line 29: Please delete "head" and insert -- heat --.

Signed and Sealed this
Tenth Day of May, 2016

Michelle K. Lee
*Director of the United States Patent and Trademark Office*